Jan. 18, 1949.  G. J. DOURTE  2,459,508
HYDRAULIC JACK FOR AUTOMOBILE TRAILERS
Filed March 18, 1946
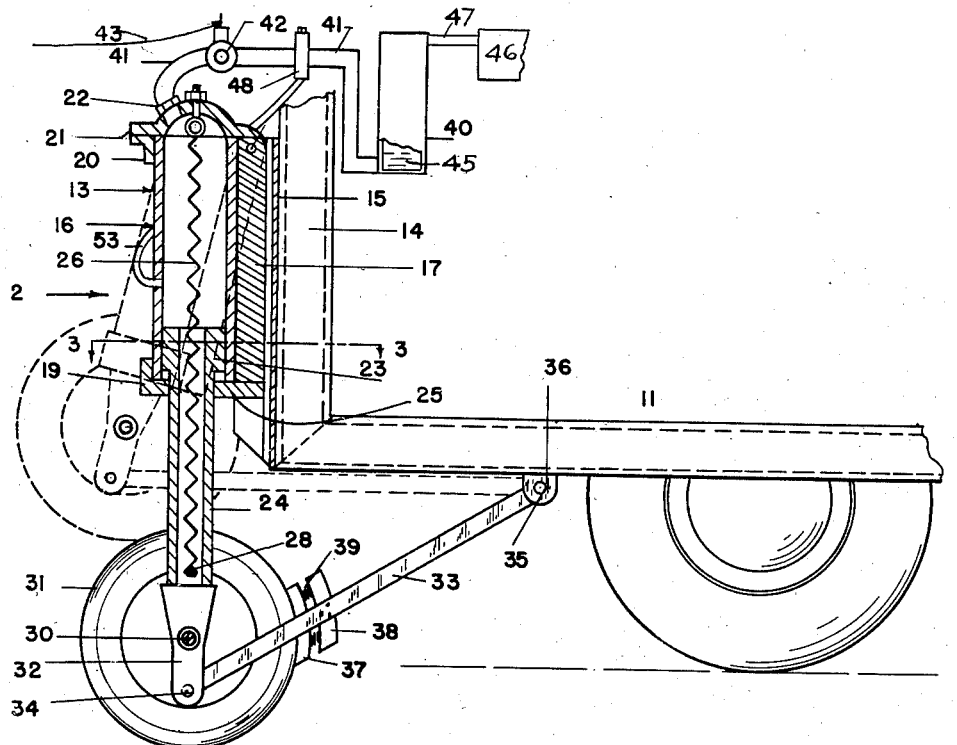
FIG. 1
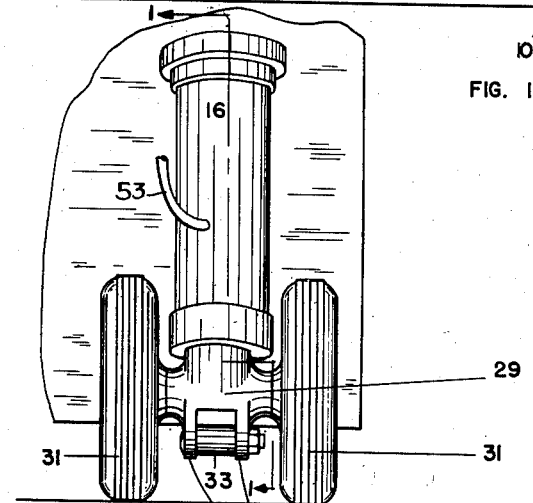
FIG. 2
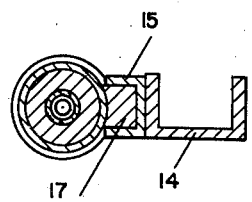
FIG. 3
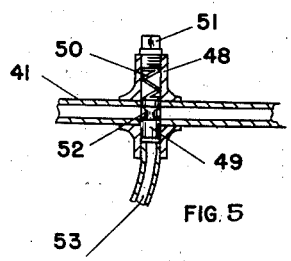
FIG. 5
FIG. 4
INVENTOR.
GEORGE J. DOURTE
BY
Martin E. Anderson
ATTORNEY Patented Jan. 18, 1949

2,459,508

UNITED STATES PATENT OFFICE 2,459,508

HYDRAULIC JACK FOR AUTOMOBILE TRAILERS

George J. Dourte, Long Beach, Calif.

Application March 18, 1946, Serial No. 655,232

2 Claims. (Cl. 254—86)

This invention relates to improvements in hydraulic jacks and has reference more particularly to a jack designed for use in connection with automobile house trailers.

The use of trailers, especially of the type employed for temporary dwellings, is extensive and increasing. Users of automobile trailers find that parking places are not always level and that it therefore becomes necessary to go to considerable trouble and labor to produce a proper supporting surface on which the trailer will stand in level position.

It is an object of this invention to produce a hydraulic jack mechanism that can be applied to trailers that are now in existence, or incorporated in new trailer constructions and which will facilitate the leveling of trailers at parking places.

The ordinary construction of house trailers is such that it is practically impossible to change tires. When this is to be done, it requires the services of several mechanical jacks to lift the trailer and support it in a position where the operator can remove the defective tire and replace it with a new one.

It is another object of this invention to produce a hydraulic jack mechanism of such construction and design that a trailer can quickly be raised from the ground a sufficient distance to permit the removal and replacement of tires.

It has been found that in spite of much care and precaution taken, trailers will separate from the tractor automobile and since most of such trailers have only one pair of wheels located centrally, serious damage is likely to result whenever such a trailer becomes detached from the tractor. Even where the trailer is provided with two spaced tracks, accidental detachment during travel on the road is most sure to result in great damage.

It is an object of this invention to produce a hydraulic jack mechanism that shall become automatically effective whenever the trailer separates from the tractor automobile and which will almost instantly bring into operative position wheels to contact the road surface and keep the trailer in substantially normal position and which will, at the same time, apply a brake that will function to bring the trailer to a stop.

A further object of this invention is to produce a construction and an arrangement of parts that will greatly simplify the construction and operation of such automatic hydraulic jacks and which will simplify the problem of maintaining the necessary operating fluid under pressure.

A further object of the invention is to produce a hydraulic jack mechanism of such construction that the strains produced when the jacks are brought into operative position during the travel of the trailer, will be resisted by strong, rigid beams so as to prevent damage to the hydraulic lift mechanism itself.

Having thus called attention to some of the principal objects of this invention, the invention itself will now be described in detail and for this purpose reference will be had to the accompanying drawings in which one embodiment of the invention has been illustrated, and in which:

Figure 1 is a view partly in section taken on line 1—1, Figure 2, and partly in elevation showing one hydraulic jack applied to the frame of a house trailer;

Figure 2 is a front elevation looking in the direction of arrow 2, Figure 1;

Figure 3 is a section taken on line 3—3, Figure 1;

Figure 4 is a diagrammatic plan view of the chassis frame of a house trailer showing the positions of the jacks with respect to the trailer frame; and Figure 5 is a vertical section taken through pipe 41 and cylinder 48 shown at the top of Figure 1.

In the drawing reference numeral 10 designates the surface of the ground and reference numeral 11 designates one of the side members of the trailer frame. The wheels for supporting the trailer have been designated by reference numeral 12. At each corner of the chassis frame a hydraulic jack has been positioned. These jacks have been designated in their entirety by reference numeral 13. Most trailers are provided with a vertical frame member 4 at each corner and when this is the case a channel, like that designated by reference numeral 15, is secured to the vertical frame member by bolts, rivets or by welding, as may be found most desirable. The channel faces forwardly, as shown in Figure 3. The hydraulic jack itself consists of a cylinder 16, which may be made from any suitable material, preferably steel tubing. Welded or otherwise secured to the rear side of the cylinder, as shown in Figure 1, is a rectangular bar 17 of a size to fit the channel in member 15. The upper end of bar 17 is provided with an opening for a pivot 18 which extends through the webs of the channel and forms a hinge pivot about which the cylinder can move from the full line position to the dotted line position shown in Figure 1. The cylinder is provided at the lower end with a cylinder head 19 which may be secured in place in any suitable manner. The upper end of the cylinder is provided with an annulus 20 having an outwardly extending flange 21 to which is attached a removable cylinder head 22. A piston 23 is mounted in the cylinder and is provided with the usual piston rings or other means for effecting a tight seal between it and the cylinder wall. Extending downwardly from the piston is a piston rod 24 which may be of substantially the same diameter as the inside of the cylinder, but which has been shown of a somewhat smaller diameter to provide a shoulder 25 that functions as a stop. Piston rod 24 is hollow and a helical tension spring 26 has its upper end connected with the cylinder head at 27. The lower end of the spring is connected with the lower end of the piston rod at point 28. The spring is of such strength and normally under such tension that, when there is no pressure in the cylinder chambers above the piston, the spring will function to hold the cylinder in its uppermost position and bring the parts to the dotted line position shown in Figure 1.

Secured to the lower end of the piston rod is a casting 29 that has laterally extending shafts 30 on which is rotatably mounted two rubber tired wheels 31. Extending downwardly from the casting 29 are two lugs 32 that are spaced some distance apart as shown in Figure 2. A strut 33 has its lower end positioned between the lugs 32 and is connected thereto by means of a pivot 34. The other end of the strut is pivoted at 35 between two downwardly extending lugs 36. The strut is of such length that when the jack is in the position shown in Figure 1, the cylinder will be substantially parallel with channel 15 and bar 17 will therefore be positioned wholly within the channel between the flanges thereof. This position of the cylinder and bar assures that the cylinder will be firmly held against lateral movement. The function of the strut 33, in addition to that of controlling the position of the cylinder, is to resist longitudinally acting forces when the jacks are brought into operative position. It will be readily seen from Figure 1 that any force tending to push wheel 31 rearwardly, or to move it forwardly, will be resisted by the strut. This arrangement assures that no bending force will be applied to the piston rod. Another function of strut 33 is to keep the wheel assembly and the piston from turning in the cylinder, thereby assuring that the plane of rotation of the wheels will always be parallel to the longitudinal axis of the trailer.

Attention is called to the brake shoe 37 which is connected with the strut 33 by means of a block 38 that is rigidly connected with the strut and which is separated from the brake shoe by means of springs 39. It will be evident that, since pivot 34 is below the center of wheels 31, the brake shoe will be moved into operative position in response to the downward movement of the wheel and that when the wheel moves upwardly to the dotted line position, the brake will be removed. It is apparent from the above that whenever the jacks are operated and moved downwardly the brake will be automatically applied.

The jacks are operated by fluid under pressure and for the purpose of this explanation this fluid will be considered as ordinary air confined in a container which has been designated by reference numeral 40. A pipe 41 extends from the fluid reservoir to the cylinder head 22. Pipe 41 is provided with a valve 42 that is normally held in closed position. A cable or other tension member 43 connects the handle of the valve with the tractor automobile. This cable is normally quite slack but in case the connection between the tractor and the trailer is broken, cable 43 will be subjected to a quick and severe strain that will open valve 42, whereupon fluid under pressure will rush into the cylinder moving the piston and associated parts downwardly until the wheels come into engagement with the road surface. The downward movement of the four jack wheels will give the trailer a stable foundation and since the brake mechanism becomes automatically operative when the wheels move downwardly they will be subjected to this braking action when they reach the ground and will therefore tend to bring the trailer to a stop. The brake is also useful during the ordinary parking because it resists any forces tending to move the trailer longitudinally.

When the jacks have been brought into operative position, they may be held in this position by closing valve 42 and if liquid such as oil is used to produce the pressure on the piston, the piston will be firmly held in an adjusted position because a liquid is practically incompressible.

When the jacks are to be returned to inoperative position, the pressure on the fluid is released, whereupon the tension exerted by spring 26 will raise the wheels to the position shown by dotted lines in Figure 1.

The fluid employed for operating the jacks may be contained in a large cylinder like that designated by reference numeral 40, or it may be contained partly in large pipes like those designated by reference numeral 44. These pipes have been shown as extending diagonally, thence across the trailer frame, with both ends connected with the corresponding jack cylinders by pipes having valves 42. The arrangement of pipes 44 produces a bracing that gives rigidity to the trailer frame and when they are used as part of the reservoir space, the tank 40 can be smaller than it otherwise would be.

In the drawing a single jack mechanism has been shown as applied to one corner of a trailer frame. As shown in Figure 1, each trailer is presumed to have four hydraulic jacks and these may be controlled by a single valve like that shown in 42 or they may be independently controlled or they may have other valves by means of which each of the jacks can be controlled independently of the others. For safety on the road the parts are so arranged that all of the jacks are made operative whenever valve 42 opens, due to a disconnection of the trailer and the tractor.

Attention is called to the fact that the parts have been shown in a more or less diagrammatic manner so as to make the construction easy to understand and it is to be understood that specific details of construction may be resorted to so as to effect a mechanically practical design. The parts illustrated on the drawing are, however, operative as shown and are believed to be sufficiently detailed to form the basis for the appended claims.

The use of high pressures is contemplated and it is also believed to be preferable to employ both oil and air as the fluid for operating the jacks. Oil, as above mentioned, is incompressible or substantially so, and tank 40, which must have a greater volume than the piston displacement is partially filled with oil 25 and is connected at its top with an air reservoir 46 by means of a pipe 47.

It is desirable to automatically cut the communication between the cylinder and tank 40 before the piston engages the lower cylinder head so as to avoid the danger of breakage; to effect this stoppage, pipe 41 is provided with a pressure operated valve having a piston 49 that is held in its lowermost position by spring 50 and plug 51. Piston 49 has a groove 52 about its outer surface which provides a passage between the two ends of pipe 41 (Figure 4). A pipe 53 communicates at its upper end with cylinder 48 beneath piston 49 and has its lower end in communication with the interior of cylinder 16 directly above the lowermost position of the upper surface of piston 23. As soon as piston 23 uncovers the opening into pipe 53 fluid will communicate pressure to cylinder 48, moving piston 49 upwardly and cutting off communication between the two ends of pipe 41.

It is to be understood that ordinary valves and pressure gauges may be provided wherever necessary or desirable. The specific guide means for preventing lateral movement of the piston can be replaced by any mechanical equivalent. Spring 26 has been shown inside of the cylinder but may be positioned outside and instead of a single spring, a plurality may then be used.

Having described the invention what is claimed as new is:

1. A hydraulic jack assembly comprising, a frame having a horizontal and a vertical frame member, a cylinder pivotally connected, near its upper end, with the vertical frame member, guide means comprising a member attached to the vertical frame member and another connected with the cylinder for resisting lateral forces, one of said members having a channel and the other a web adapted to jackknife in the channel, a piston in the cylinder, a piston rod connected at its upper end with the piston, the lower end extending through the lower end of the cylinder, an axle block secured to the lower end of the piston rod, a shaft extending transversely of the block, a wheel on each end of the shaft, a strut having one end pivoted to the axle block, between the wheels, the other end being pivoted to the horizontal frame member, forming means for resisting longitudinally acting forces, and means comprising a spring having one end connected with the lower end of the piston rod and the upper end connected with the cylinder, for normally holding piston and wheel in elevated position.

2. A hydraulic jack assembly for use with automobile trailers and the like comprising, in combination, a frame having a horizontal and a vertical member in the same plane, a channel shaped member attached to the vertical frame member, a cylinder having one side provided with a web of proper width to fit the channel, the web being pivotally connected near its upper end with the webs of the channel and adapted to "jackknife" into and out of the channel, a piston in the cylinder, a hollow piston rod having its upper end secured to the piston, an axle block secured to the lower end of the piston, a helical compression spring having the lower end thereof in the hollow piston rod and attached thereto, the upper end of the spring being connected with the cylinder near its upper end, the spring being tensioned to normally hold the piston and attached parts in their uppermost position, an axle extending transversely of the axle block, a wheel on each end of the axle, the axle block having a pivot parallel with the axle, and a strut having one end connected with the pivot and the other end pivotally connected with the horizontal frame member.

GEORGE J. DOURTE.

REFERENCES CITED

The following references are of record in the file of this patent:

UNITED STATES PATENTS

| Number | Name | Date |
| --- | --- | --- |
| 1,448,531 | Gow | Mar. 13, 1923 |
| 1,548,559 | Simpson | Aug. 4, 1925 |
| 2,140,264 | Kingham | Dec. 13, 1938 |
| 2,142,216 | Seyferth | Jan. 3, 1939 |
| 2,381,529 | Willis | Aug. 7, 1945 |